Nov. 26, 1940.  C. EHRET  2,223,097
SAFETY DEVICE FOR MOTOR VEHICLES
Filed Sept. 17, 1937  5 Sheets-Sheet 1
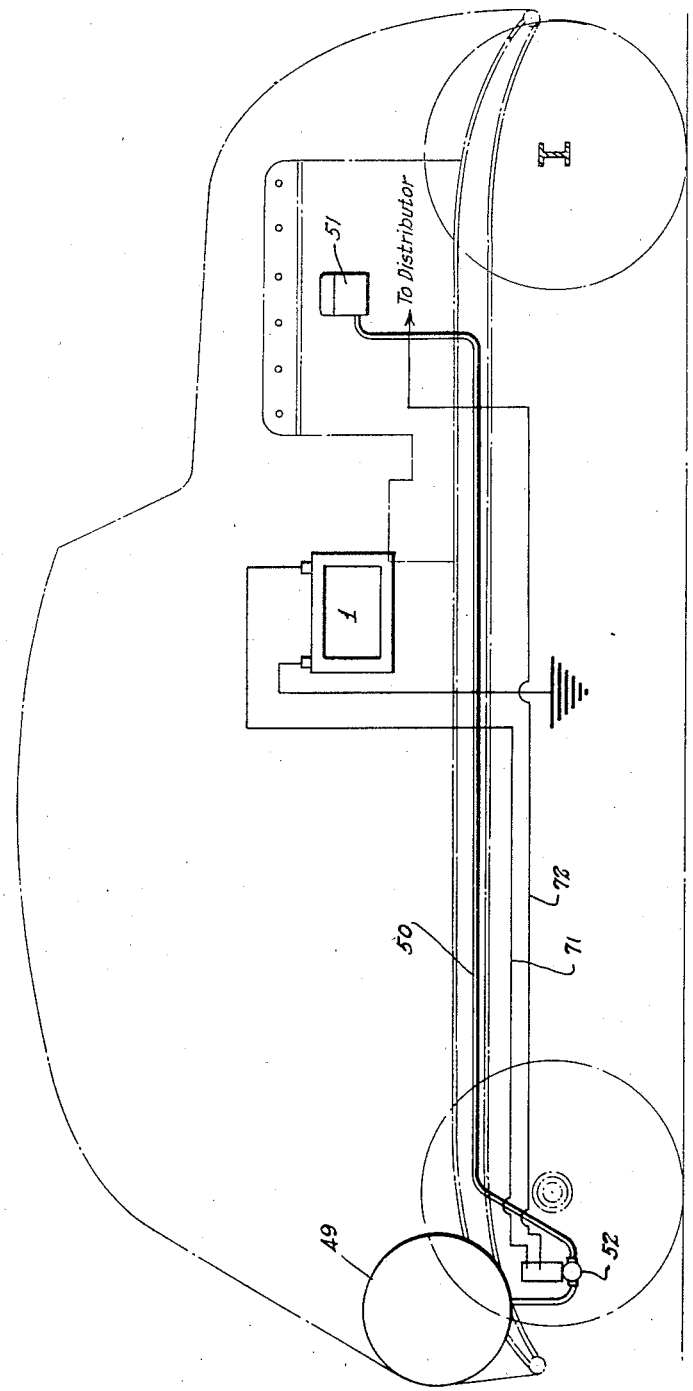
INVENTOR.
Clement Ehret
BY Cornelius Zabriskie
ATTORNEY.

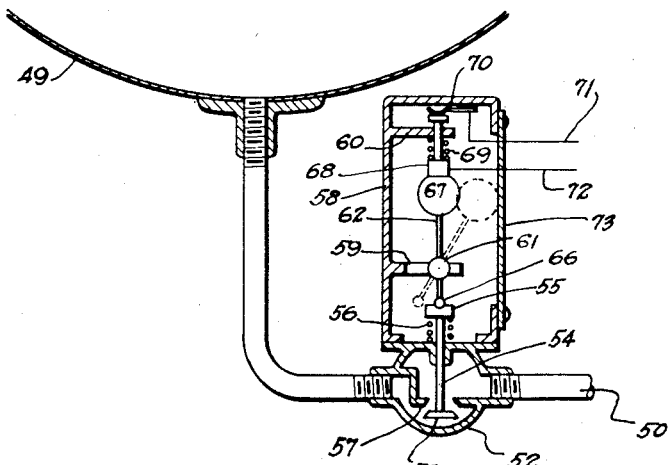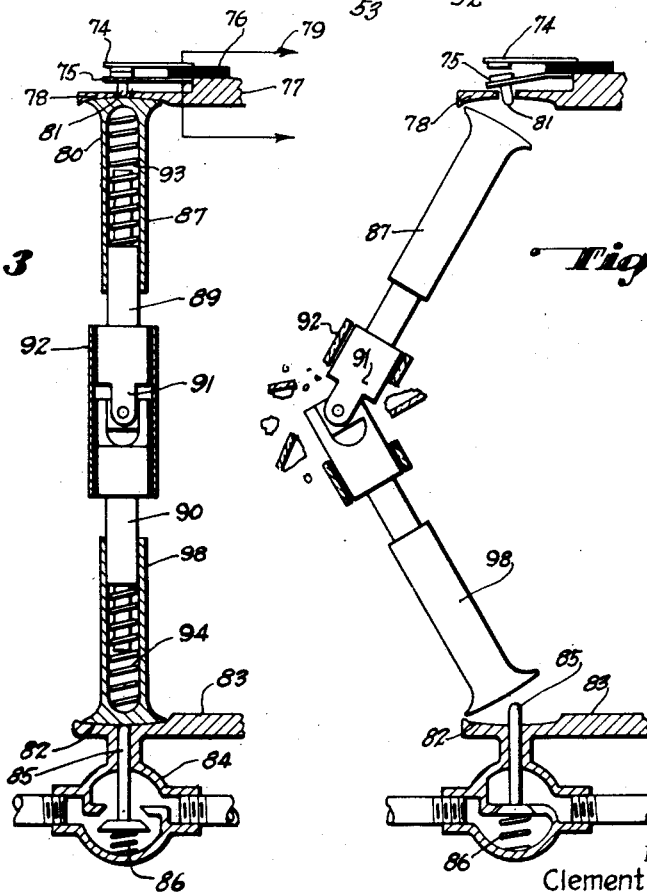

Nov. 26, 1940.  C. EHRET  2,223,097
SAFETY DEVICE FOR MOTOR VEHICLES
Filed Sept. 17, 1937   5 Sheets-Sheet 3
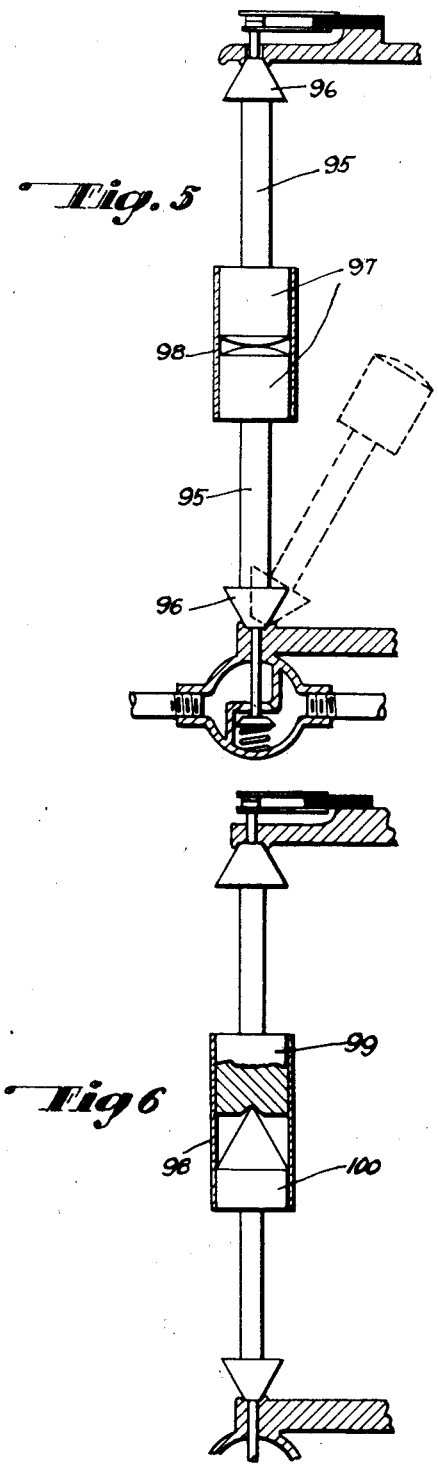
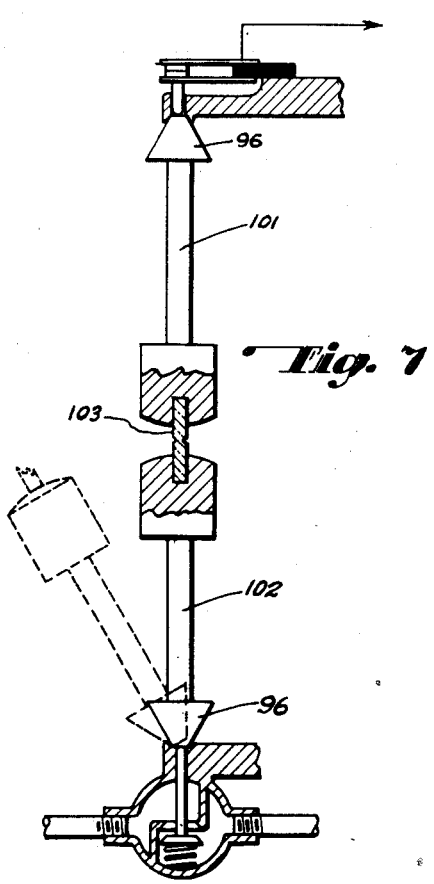
INVENTOR.
Clement Ehret
BY
ATTORNEY.

Nov. 26, 1940.  C. EHRET  2,223,097
SAFETY DEVICE FOR MOTOR VEHICLES
Filed Sept. 17, 1937   5 Sheets-Sheet 4
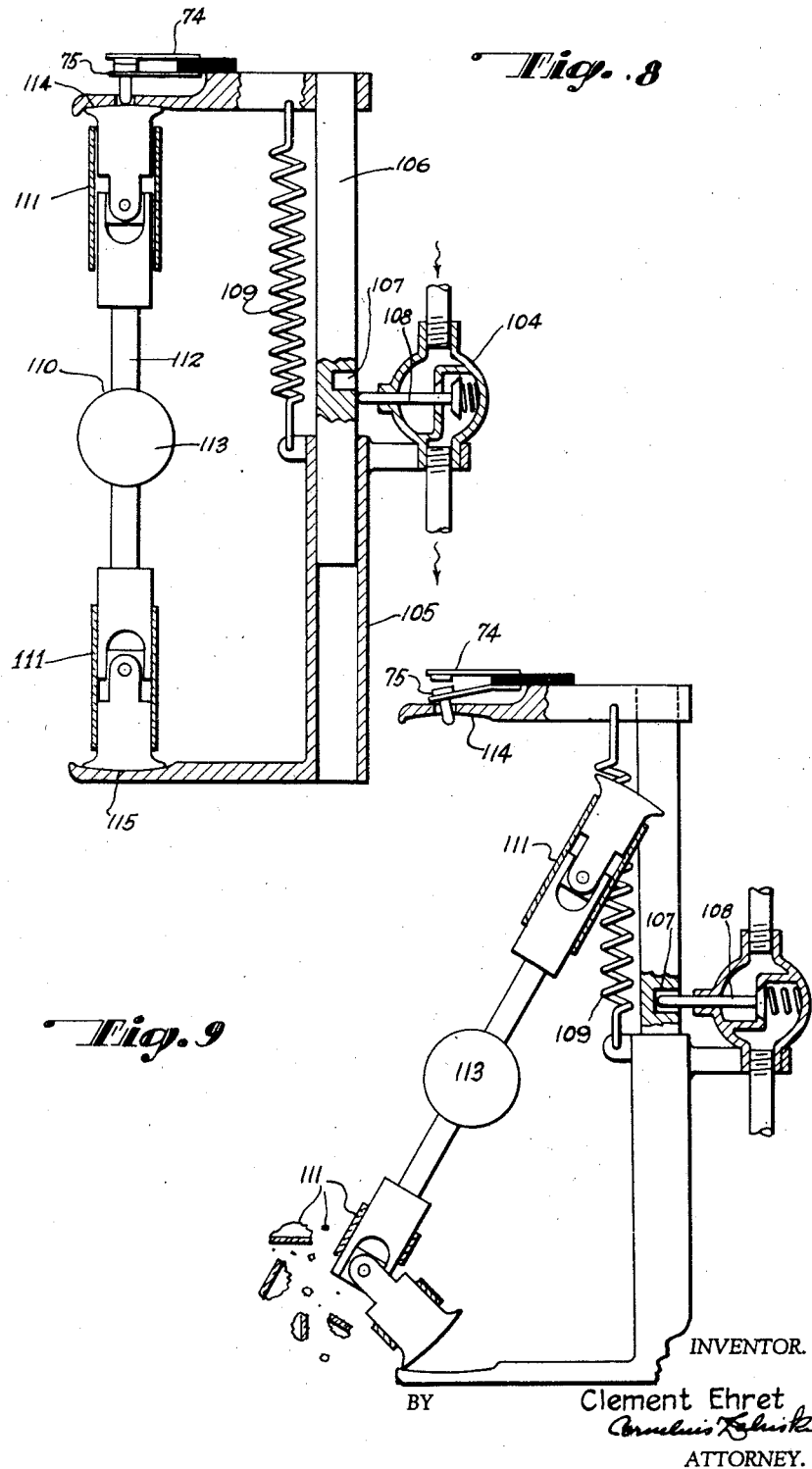
INVENTOR.
Clement Ehret
BY
ATTORNEY.

Nov. 26, 1940.  C. EHRET  2,223,097
SAFETY DEVICE FOR MOTOR VEHICLES
Filed Sept. 17, 1937   5 Sheets-Sheet 5

INVENTOR.
Clement Ehret
BY
ATTORNEY.

Patented Nov. 26, 1940

2,223,097

UNITED STATES PATENT OFFICE 2,223,097

SAFETY DEVICE FOR MOTOR VEHICLES

Clement Ehret, White Plains, N. Y.

Application September 17, 1937, Serial No. 164,381

5 Claims. (Cl. 200—52)

This invention relates to safety systems for motor vehicles as generally hereinafter defined and is directed, more particularly, to the provision of means which will eliminate or minimize injury from fire to the occupants of a motor vehicle in the event of collision or accident.

The invention is adapted for use in any land or air vehicle, such as automobiles, trucks, aeroplanes, trains and the like, which include a self contained prime mover actuated by combustible motive fuel.

Experience has shown that, when such motor vehicles are involved in an accident of a serious nature, there is an ever-present tendency of breakage of fuel lines or continued feed of fuel with the result that highly combustible liquids are permitted to flow over highly heated parts or are exposed to sparks, due to short circuiting of the ignition system or other causes, with consequent fire hazard. It is not uncommon for the occupants of such a vehicle to survive the impact of the accident, only to be subsequently killed by an ensuing fire. Aviators are trained to manually shut off the engines in the event of impending crash and if the fuel lines and containers survive the crash, fire does not generally occur, but if the fuel line breaks, a conflagration usually results fatally for all the occupants of the plane.

With the foregong considerations in mind, the object of the present invention is to incorporate within either the fuel or ignition systems of a motor driven vehicle, and preferably in both, means for automatically shutting off the fuel and breaking the ignition circuit upon the occurrence of an accident such as might cause a fire.

An important feature of the present invention resides in the provision of such safety means as will not interfere with the proper functioning of the vehicle under ordinary conditions, but will become effective only in the event of accidents.

A further feature of the invention consists in the employment of devices, whereby the vehicle may be rendered operative in the event that the accident was not so serious as to preclude operation of the vehicle thereafter, whereby the operator is enabled to drive the vehicle to a convenient place of repair or to continue his journey, as circumstances may warrant.

An important feature of the invention consists in the completely automatic character of the system of this invention. It does not require, for its proper operation, any manual or mental activity on the part of the operator, but operates in an entirely automatic manner upon the occurrence of the accident.

An additional feature of this invention is inherent in the fact that is can be readily incorporated in conventional motor vehicles without undue cost and in a simple, effective manner.

Features of the invention, other than those adverted to, will be apparent from the hereinafter detailed description and claims, when read in conjunction with the accompanying drawings.

The accompanying drawings illustrate different practical embodiments of the invention, but the constructions therein shown are to be understood as illustrative, only, and not as defining the limits of the invention.

Figure 1 is a diagrammatic view showing the invention including means for breaking the ignition circuit and shutting off the fuel supply.

Figure 2 shows one form of circuit breakers of this invention with associated means for shutting off the fuel supply.

Figure 3 shows another combined circuit breakers and fuel shut-off device in section.

Figure 4 shows the device of Figure 3 in the process of operation to break the circuit and shut off the fuel.

Figures 5–8 show other combined circuit breaker and shut-off mechanism of this invention.

Figure 9 shows the device of Figure 8 in the process of operation to break the circuit and shut off the fuel.

Figure 10:
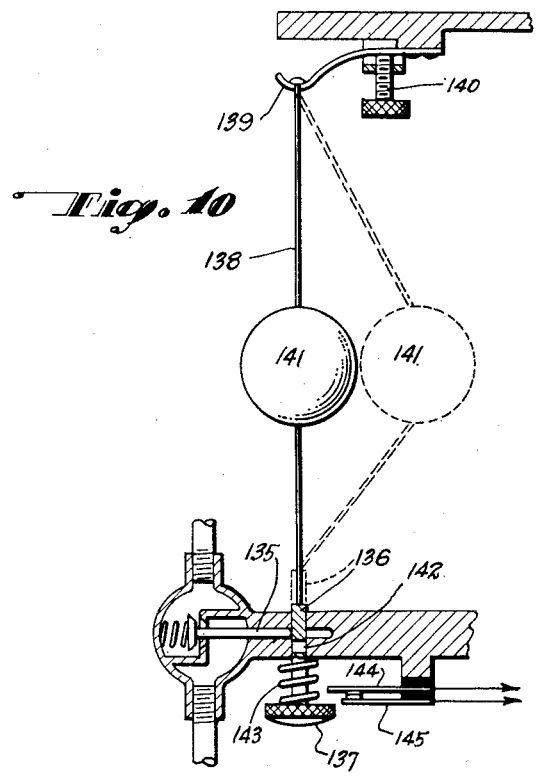
Figures 10, 11 and 12 show additional combined circuit breaker and fuel shut-off devices of this invention.

In Figure 1, the fuel is contained in the tank 49 here shown as positioned at the rear of the car, but, in practice it may be placed in any location. The fuel is fed through the usual pump or otherwise. Adjacent the tank 49, and included in the fuel line, is a valve 52 which serves to automatically shut off the fuel in the event of accident and with which may be associated means to simultaneously break the ignition circuit. One satisfactory form of mechanism for accomplishing these results is shown in Figure 2. Here the valve casing is indicated at 52, while the sealing member of the valve is shown at 53 and is provided with a valve stem 54 which extends through an appropriate stuffing box and has a head 55 with a concave seat in its upper face. A spring 56 normally tends to seat the sealing member 53 on its seat 57.

Superimposed on the valve casing 52 is a housing 58 provided therein with two brackets 59 and 60. The bracket 59 supports a universal joint 61 mounted intermediate the ends of a rigid strut 62. The strut has a lower ball end 66 which bears against the concave seat in the head 55 and normally holds the sealing member 53 off of its seat, so that fuel can flow through the fuel line 50 to the carburetor. The upper end of the strut carries a weight 67 which is normally held in the full line position by a holder 68, the head of which has a concave surface partially embracing the weight and held in this position by a spring 69 interposed between the head and the bracket 60. When the holder is in the position shown, this upper end will engage with a flexible contact 70, insulated from the casing and connected to one wire 71 of the ignition circuit, while the other wire 72 of such circuit is connected to the holder. The wire 71 leads to one pole of the car battery, while the other wire 72 leads to the distributor in the manner of the conventional ignition circuit. In this way the holder 68 constitutes one contact in the ignition circuit, while the other contact is the flexible member 70. As long as these two are in engagement, the ignition circuit is operative.

The spring 69 is so tensioned as to hold the parts of Figure 2 in the full line positions therein indicated, under ordinary road shocks and vibration incident to normal operation of the car, but, in the event of accident, the impact resulting therefrom will be sufficient to overcome the tension of the spring 69 and cause the weight 67 to be thrown free from the holder and into the dotted line position of Figure 2. This will immediately release the valve stem, and the spring 56 will thereupon seat the same to shut off the feed of fuel to the carburetor. Simultaneously the spring 69 will withdraw the holder 68 from the contact 70 and break the ignition circuit 71—72. A cover 73 at one side of the housing is removable to permit of manual re-set. No separate emergency shunt switch is required.

I may use the structure of Figure 2, and other figures, to control either the ignition circuit alone or the fuel feed alone or both collectively as shown, without departing from this invention. The structure here shown is extremely simple and accomplishes the entire task in a thoroughly efficient way.

The structure of Figure 2 depends for its operation fundamentally upon the interposition of a rigid strut between the circuit controlling switch and the valve stem, so as to hold the switch closed and the valve open under normal conditions and until the event of an accident which serves to displace the strut and permit of the simultaneous breaking of the ignition circuit and the closing of the fuel valve. Instead of using a rigid strut, as described in connection with Figure 2, I may, however, employ a collapsible or frangible strut which may be made in various ways, as disclosed in several of the following figures of the drawings.

Referring first to Figures 3 and 4, 74 and 75 are the two leaves of a switch, insulated from one another by a block of insulation 76 supported on a bracket 77, the under side of which has a curved seat 78. The leaf 75 is resilient and normally tends to draw away from the leaf 74 to break the ignition circuit 79. The leaves are, however, normally held in contact with one another by a strut 80 which bears against the stud 81 on the leaf 75. The other end of the strut is adapted to be seated in a concavity 82 in a bracket 83 formed on the top of the valve casing 84 of the fuel supply valve. The valve stem 85 extends to the base of the concavity, so that the strut normally holds the valve unseated against the tension of a spring 86 as shown in this figure. The strut has upper and lower shoes 87 and 88, respectively, shaped to engage with the concavities 78 and 82 and these shoes are provided with sockets into which extend the stems 89 and 90, respectively, of a universal joint member 91. The pivotally movable sections of the universal joint 91 may be tightened to have enough friction or stiffness to normally hold the parts in alinement until the accident occurs or they may be enclosed within a frangible envelope, sleeve, cage or other supporting member 92 which normally precludes them from pivotal movement, and springs 93 and 94 are housed within the respective sockets of the strut shoes and bear against the ends of the stems 89 and 90 to normally hold the shoes to their seats.

Under normal conditions, the parts appear as shown in Figure 3, but, in the event of accident, with resulting sudden impact, the mass of the strut will flex at the joint and break the frangible sleeve 92 and permit the strut to collapse, as shown in Figure 4, with the result that the ignition circuit will be broken by disengagement of the contact 75 from the contact 74, while the spring 86 will simultaneously close the fuel valve, thus breaking the ignition circuit and shutting off the supply of fuel.

The structure of Figure 5 is very similar to that of Figures 3 and 4 except with respect to the strut construction. In Figure 5 the strut is composed of two sections 95 identical in construction. Each of these sections is rigid and is provided at one end with a conical head 96 and at its other end with a cylindrical knob 97. The adjacent ends of the knobs are of spherical form and adapted to bear against one another for rolling coaction within a frangible sleeve 98. Under ordinary conditions the heads 96 will respectively maintain the ignition circuit closed and the fuel valve open, but, in the event of accident, the mass of the strut will cause the sleeve 98, or its equivalent, to be broken so that the sections of the strut may be displaced to permit of the breaking of the ignition circuit and the closing of the valve.

The structure of Figure 6 is the same as in Figure 5, except that the knob 99 of the upper strut is provided with a central depression at its bottom, while the knob 100 of the lower strut has a conical portion engaging with such depression within the frangible sleeve 98. The mass of these knobs is sufficient to break the sleeve 98, or its equivalent, upon forcible impact and thus permit the strut to collapse for the purposes stated.

In the structure of Figure 7, the upper section 101 of the strut is connected to the lower section 102 by a frangible link 103 which serves to normally hold the upper and lower sections of the strut in alinement to close the ignition circuit and open the valve, but, in the event of impact, the link 103 will be broken to permit the strut to collapse for the purposes stated.

In the structures of Figures 8 and 9, I associate with a casing 104 of the fuel valve an extensible yoke comprising two sections 105 and 106, the latter of which telescopes into the former. The section 106 is provided therein with a hole 107, which, when in alinement with the valve stem 108, will permit the fuel valve to close. A spring 109 tends to bring the section 106 into this position, but this spring is normally held in restraint by a strut 110. The strut employed in this connection may be any strut disclosed in conjunction with any of the other figures or may vary to suit conditions, but, as shown, is an adaptation of the strut shown in Figures 3 and 4, but with two universal joints. Both universal joints may be enclosed within frangible sleeves or equivalent cages or the like, 111 and said joints are connected together by a rigid bar 112 carrying a weight 113. The upper section of the upper universal joint is shaped to cooperate with a concavity 114 in the upper arm of the yoke, while the lower section of the lower universal joint connects with a similar seat 115 in the lower arm of the yoke. An ignition circuit switch, comprising leaves 74 and 75 and incorporated in the ignition circuit, as in Figure 3, is normally held closed by the strut, while the displacement of the hole 107 from the valve stem 108 normally maintains the valve in open position. In the event of impact the weight 113 will cause one or both of the frangible sleeves 111 to be broken with consequent collapse of the strut, as shown in Figure 9. When this occurs the switch leaf 75 will withdraw from the leaf 74 and break the ignition circuit, while the spring 109 will depress the upper section of the yoke and permit the valve stem 108 to enter the hole 107 and allow the fuel valve to close.

In the construction of Figure 10, the valve stem 135 of the fuel valve is maintained in a position to hold the valve open by means of a slide 136, the lower end of which carries a head 137. The upper end of the slide is secured to a cable or other tension member 138, and the upper end of the cable is secured to a spring 139 with which coacts an adjusting screw 140. A weight 141 is mounted on the cable. The slide 136 has therein an opening 142 which is held out of register with the valve stem 135 by a spring 143. The adjusting screw 140 is normally adjusted to place the cable 138 under the desired tension and to hold this cable in normally taut condition. However, in the event of accident the weight 141 will be thrown laterally with sufficient force to elevate the slide 136, so that the valve stem 135 enters the opening 142 to permit the fuel valve to close. Furthermore when the head 137 of the slide is elevated, as stated, it will lift the upper leaf 144 of the ignition circuit switch from contact with the lower leaf 145 thereof and thus break the ignition circuit.

Figure 11:
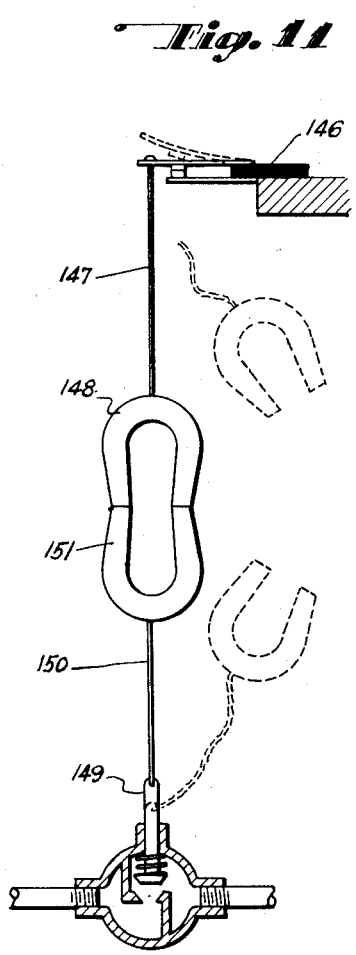

In the showing of Figure 11, the ignition switch, designated generally by the reference character 146, is normally held closed by a tension member 147 to which is secured a magnet 148. Similarly the valve stem 149 of the fuel valve is held open by a tension member 150 to which is secured a magnet 151. The two magnets or electromagnets 148 and 151 are, under normal conditions, held by their inherent magnetism in the cooperative relation shown in full lines in this figure, but, in the event of impact, due to accident, the magnets will be disengaged from one another, as indicated in dotted lines to permit the ignition circuit to be broken at the switch 146 and to allow the fuel valve to close.

Figure 12:
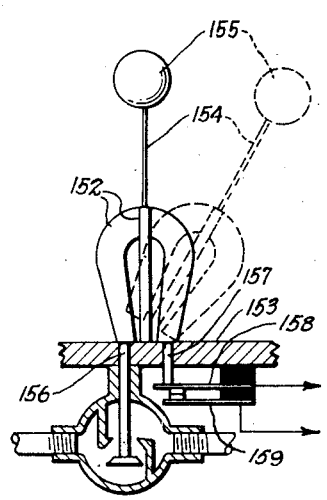

As shown in Figure 12, one or a plurality of horseshoe or electromagnets 152, arranged in angular relation and rigid with respect to one another, normally are held in upstanding position by their inherent magnetism upon a metal table 153 which may have seats in its upper face to receive the free ends of the magnets. To the magnets are secured an upstanding post 154 carrying a weight 155. The lower ends of one of the magnets bear against the valve stem 156 of the fuel valve and a plunger 157 of the ignition circuit switch, the upper leaf 158 of which is tensioned to withdraw from the lower leaf 159 when pressure on the plunger 157 is relieved. The parts will be normally held in the position shown in Figure 12 by the magnetic force of the magnets, but, in the event of forceful impact, the weight 155 will cause the magnets to be unseated and tipped over to permit the closing of the fuel valve and the opening of the ignition circuit.

It will be understood that, while I have shown various specific embodiments of this invention, many of the features described may be used interchangeably in different constructions and in other combinations than as specifically illustrated and the invention is to be understood as contemplating such use. It is also within the purview of this invention to use a plurality of the breakers hereinbefore described in series in the ignition circuit so as to provide multiple safeguards in said circuit.

In the foregoing detailed description, I have set forth different modifications of the invention for illustrative purposes and in order to show that the invention may be accomplished in widely varying ways. Other and additional means for carrying out this invention may be well adapted to particular uses or to particular installations and the invention is therefore to be understood as fully commensurate with the appended claims.

In every instance which I have described, the broad underlying concept of the invention is present. The ignition system, while normally effective, is operable to be automatically de-energized upon forcible accidental impact of any part of the vehicle with a foreign body. In every case, the circuit breaker, which accomplishes this result, comprises controlling means of sufficient mass to be displaced from its normal circuit closing position by its own momentum when movement of the vehicle is accidentally suddenly arrested or movement retarded due to other than natural causes. In some instances, the member which controls either or both the circuit breaker, or the fuel shut off valve, takes the form of a mobile liquid mass, while, in other cases, it takes the form of a solid mass, such as a weight, or a plurality of weights. In every instance, however, the accidental conditions referred to bring about the safeguarding of the occupants of the vehicle.

In some cases the circuit breaker forms part of or acts directly upon the ignition circuit to open said circuit upon the event of accident. In other cases the circuit breaker acts indirectly upon the ignition circuit through a shunt circuit including fuses or the like to cause opening of the ignition circuit. Relays or other appropriate means may be employed in either connection but, in the final analysis, the essential feature, insofar as concerns the ignition circuit, consists in the employment of means for positively opening the ignition circuit upon the event of accident or this may be accomplished, according to this invention, by any appropriate circuit breaker constituted and connected to produce this result.

In the foregoing detailed description of the invention I have, for the purpose of illustration, described the same as employed particularly on land vehicles, such as automobiles or the like, but I wish it understood that I do not restrict the invention to this particular use as it may be employed on other means of transportation which are self propelled and which utilize electrical circuits controlling the ignition of motive fuel. The invention is to be understood as commensurate with this conception.

Having thus fully described the invention, what I claim as new and desire to secure by Letters Patent is:

1. The combination of a self propelled vehicle having an ignition circuit provided therein with a switch normally tending to open, and a fuel supply system including a valve normally tending to close, an upright magnetic means interposed between the valve and the switch to normally hold the switch closed and the valve open, said magnetic means being weighted with sufficient mass to be dislodged from its normal position to permit the valve to close and the switch to open when the vehicle is subjected to impact in any horizontal direction.

2. The combination of a self propelled vehicle having an ignition circuit provided therein with a switch normally tending to open, and a fuel supply system including a valve normally tending to close, and a single upright compression member interposed between the valve and the switch with one end acting on the valve and the other end acting on the switch to normally hold the switch closed and the valve open, said member being weighted with sufficient mass to be dislodged from its normal position to permit the valve to close and the switch to open when the vehicle is subjected to impact in any horizontal direction.

3. The combination of a self propelled vehicle having an ignition circuit provided therein with a switch normally tending to open, and a fuel supply system including a valve normally tending to close, and a single upright tension member interposed between the valve and the switch with one end acting on the valve and the other end acting on the switch to normally hold the switch closed and the valve open, said member being weighted with sufficient mass to be dislodged from its normal position to permit the valve to close and the switch to open when the vehicle is subjected to impact in any horizontal direction.

4. The combination of a self propelled vehicle having an ignition circuit including a switch, and a fuel supply system including a valve, the switch and valve being spaced apart, a single upright connection device, one end of which acts upon the switch and the other end of which acts upon the valve to hold the valve open and the switch closed, said connection device being of sufficient mass to insure its dislodgment from its normal position with respect to the switch and the valve when the vehicle is subjected to impact in any horizontal direction.

5. The combination of a self propelled vehicle having an ignition circuit including a switch, and a fuel supply system including a valve, the switch and valve being spaced apart, a single collapsible strut, one end of which acts upon the switch and the other end of which acts upon the valve, and a frangible member for normally holding the strut in distended condition to maintain the valve opened and the switch closed, said strut being weighted with sufficient mass to break the frangible member and permit the collapse of the strut to release the valve and switch when the vehicle is subjected to impact from any horizontal direction.

CLEMENT EHRET.